Feb. 16, 1932.  W. T. BLANEY  1,845,740
STREET SWEEPER
Filed Jan. 13, 1930  5 Sheets-Sheet 1
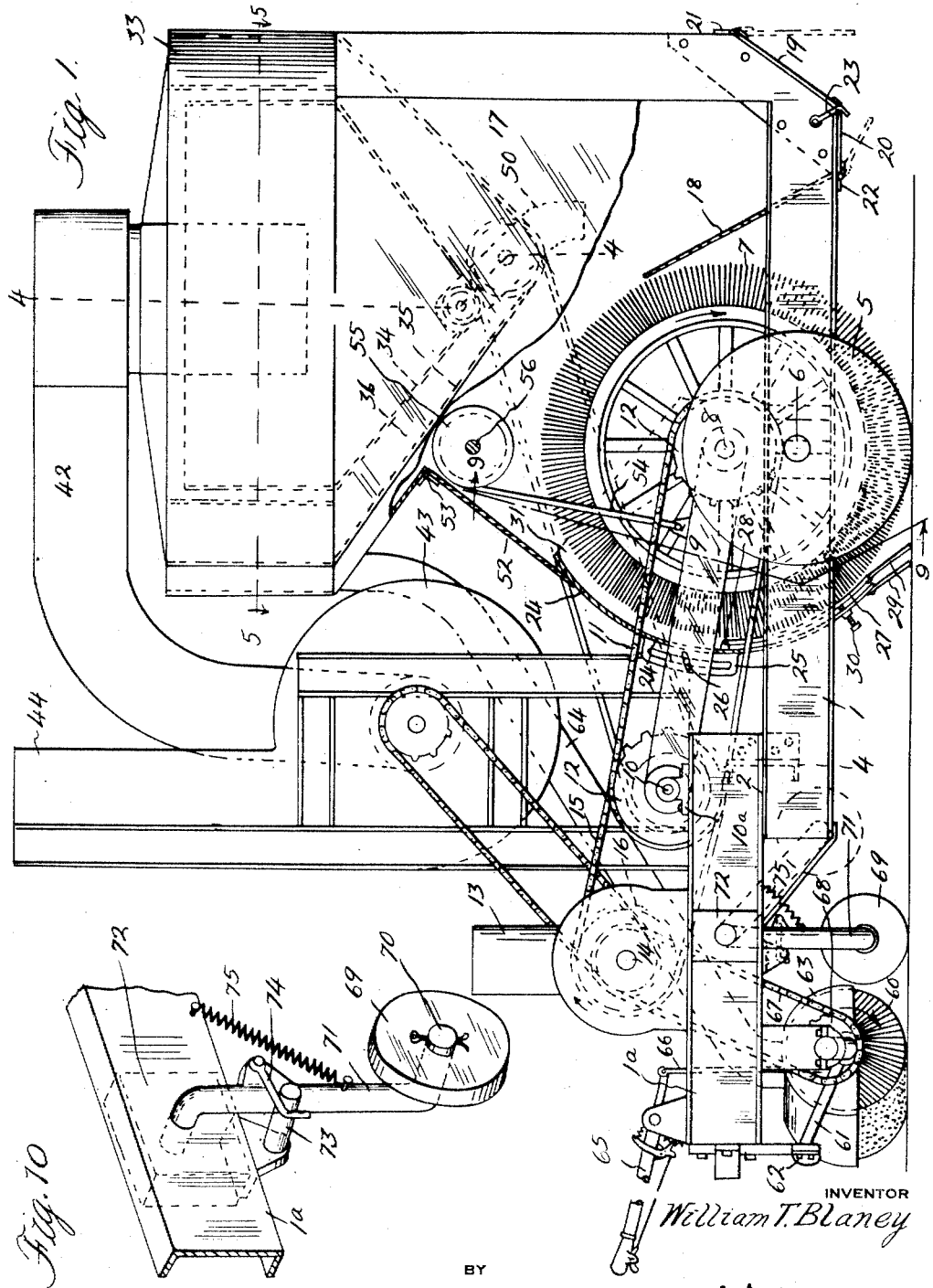
INVENTOR
William T. Blaney
BY
J. S. Murray
ATTORNEY

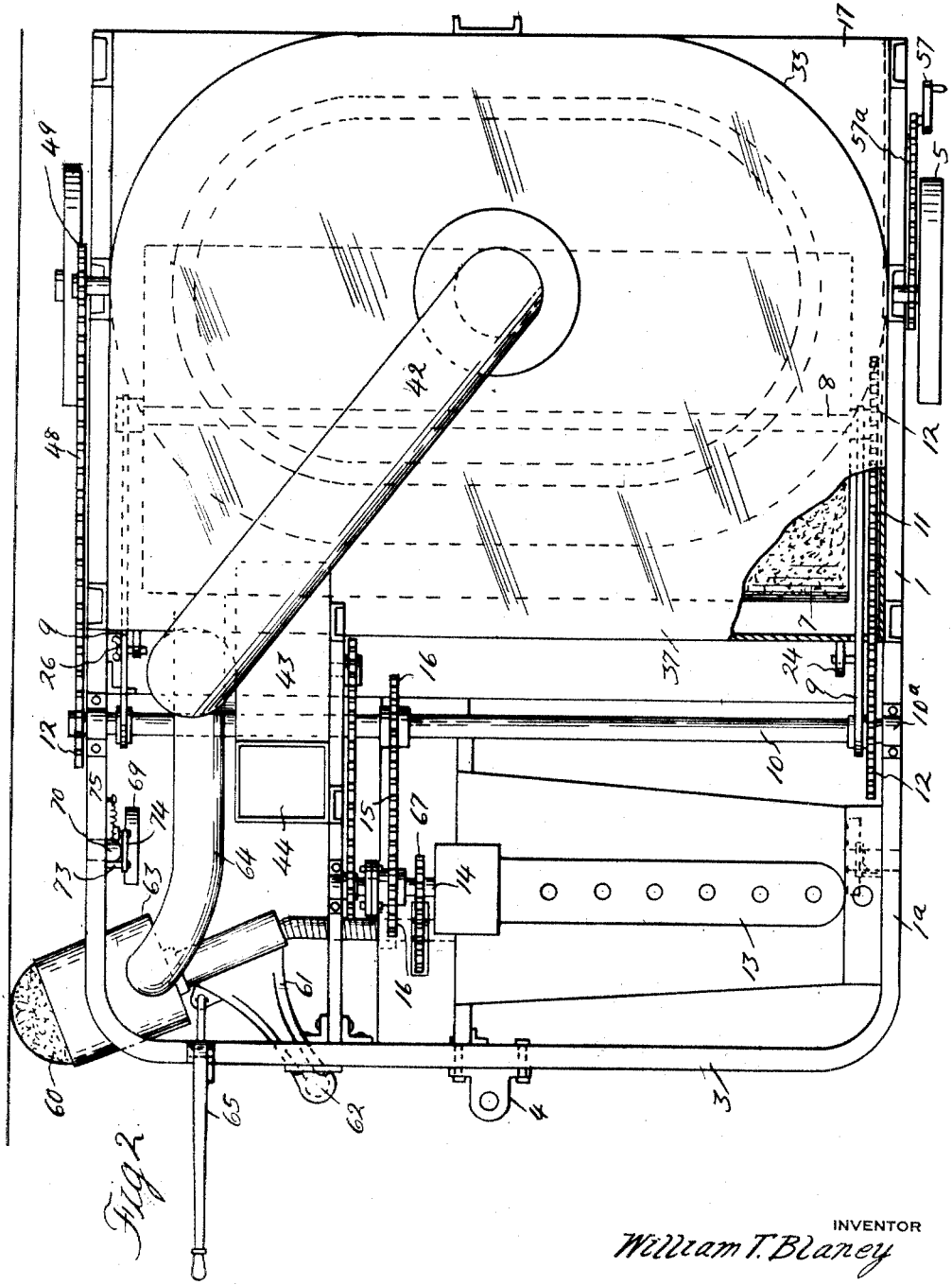

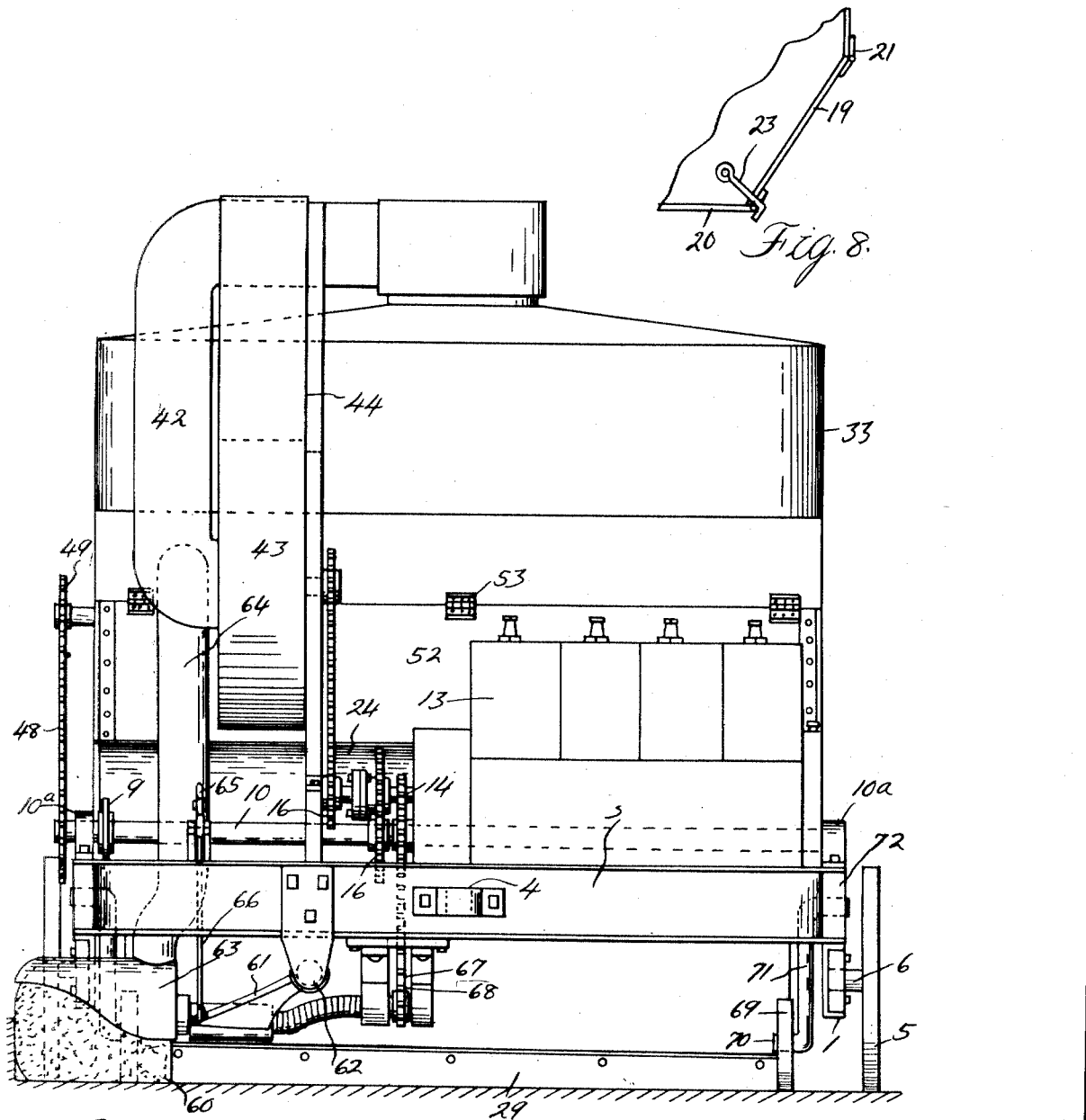

Feb. 16, 1932.   W. T. BLANEY   1,845,740
STREET SWEEPER
Filed Jan. 13, 1930   5 Sheets-Sheet 4
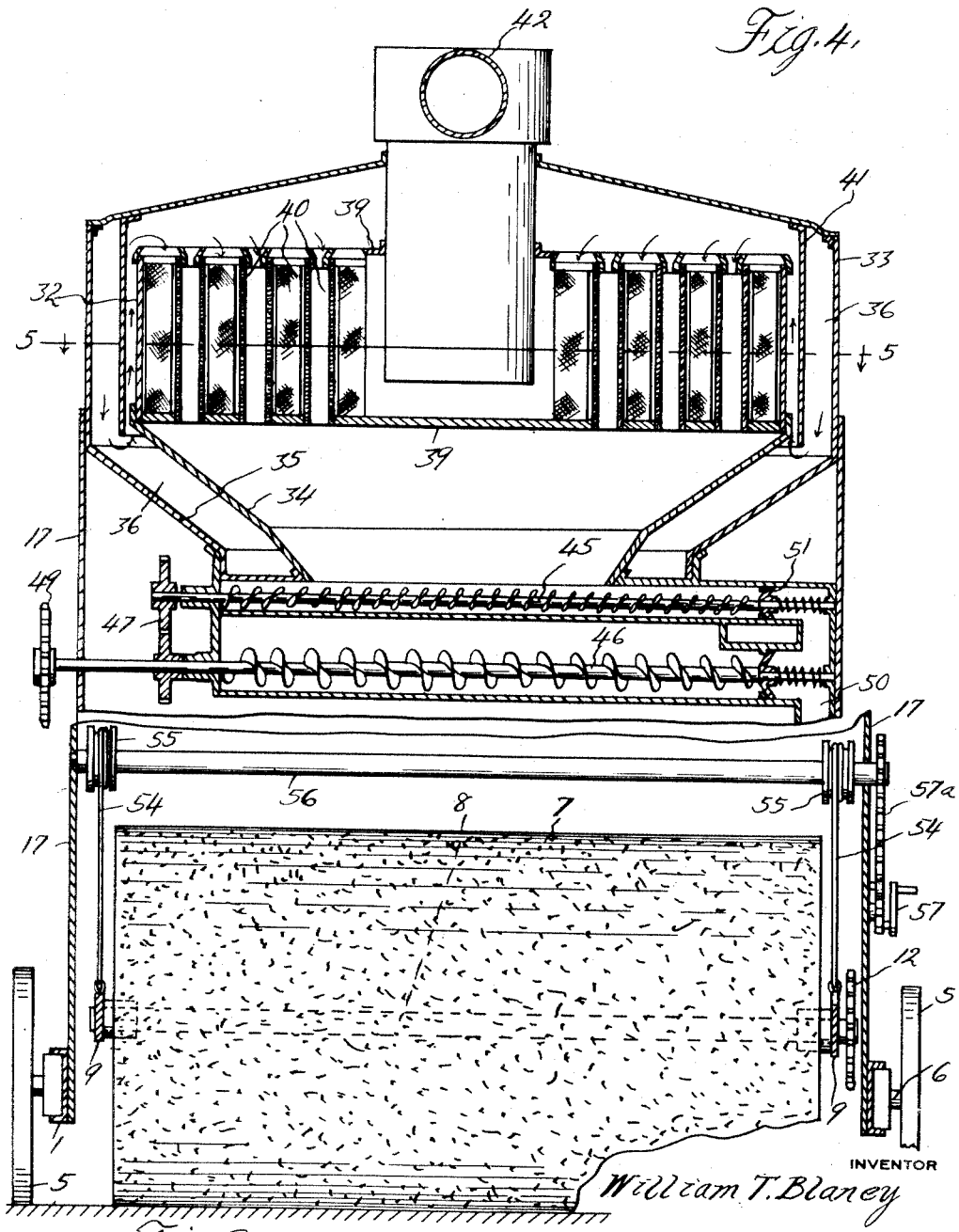

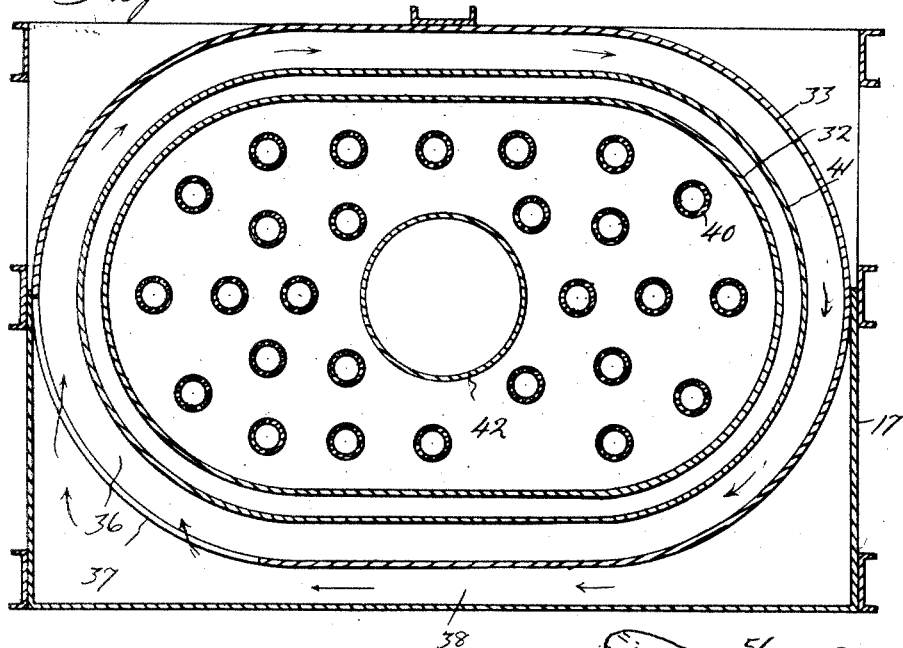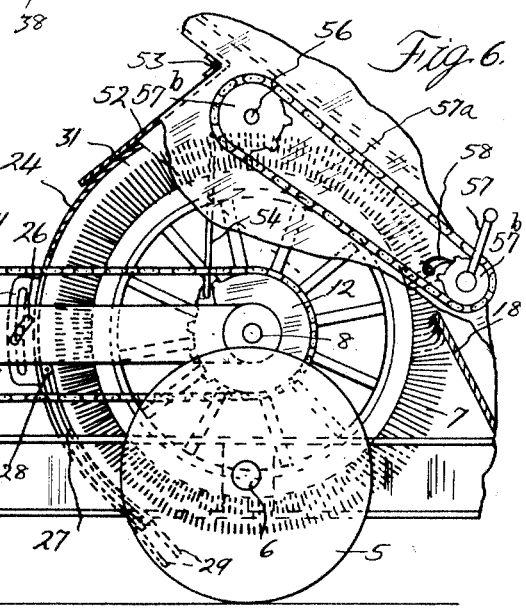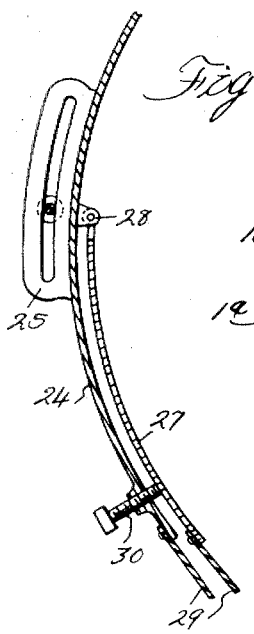

Patented Feb. 16, 1932

1,845,740

UNITED STATES PATENT OFFICE

WILLIAM T. BLANEY, OF DETROIT, MICHIGAN, ASSIGNOR OF ONE-HALF TO JAMES R. SANDERSON, OF LONDON, ONTARIO, CANADA

STREET SWEEPER

Application filed January 13, 1930. Serial No. 420,567.

This invention relates to street sweeping machines, and particularly to machines employing a rotary sweeping brush.

An object of the invention is to journal the rotary brush of a street sweeper upon a pair of radius arms, engaging opposite ends of said brush and pivoted upon the frame of the sweeper to provide for raising and lowering of said brush.

Another object is to mount upon said radius arms in forwardly spaced relation to said brush, a guide plate for sweepings and to adapt said plate to be upwardly adjusted upon said arms to compensate for wear of the brush.

Another object is to mount upon the frame of a street sweeper a housing receiving the upper portion of a rotary sweeping brush, and to provide in said housing, rearwardly of the brush, a hopper to receive sweepings.

Another object is to provide upon the frame of a street sweeper a housing receiving the upper portion of a rotary sweeping brush, to locate within said housing a hopper, directly receiving sweepings from the brush, to close the said housing at its top by a dust separator, and to withdraw air from said housing through said dust separator.

Another object is to provide improved means for raising said rotary sweeping brush from its position of use to a stored position.

Another object is to so arrange the wheel axis of a two-wheeled street sweeper in substantially the vertical plane of a rotary sweeping brush, so that the latter may move with the wheels into and out of any depressions in a street or roadway.

Another object is to provide a street sweeper with a main rotary sweeping brush extending transversely of the sweeper frame, and to further mount on said frame a curb brush projecting outward beyond an end of the main brush, and rearwardly inclined from its outer to its inner end to direct sweepings into the path of the main brush.

Another object is to conduct the dust raised by a plurality of rotary street sweeping brushes to the same dust separator.

Another object is to drive the curb brush of a street sweeper through a flexible shaft and utilize the flexibility of such shaft to accomplish raising and lowering of said brush.

These and various other objects the invention attains by the construction hereinafter described and illustrated in the accompanying drawings, wherein:

Fig. 1 is a view in side elevation and partial section of the improved sweeper.

Fig. 2 is a plan view of the same.

Fig. 3 is a front view of said sweeper.

Fig. 4 is a cross sectional elevation taken upon the line 4—4 of Fig. 1, primarily showing the dust separator.

Fig. 5 is a horizontal, sectional view of the dust separator, taken upon the line 5—5 of Fig. 1.

Fig. 6 is a fragmentary view in side elevation and partial section of the sweeper brush and its mounting, showing the raised, stored position of said brush.

Fig. 7 is an enlarged view of a portion of Fig. 6, showing primarily a provision for adjustment of the sweepings guide plate to regulate its spaced relation to the brush.

Fig. 8 is a fragmentary, side elevational view of the rear end portion of the housing into which sweepings are delivered, showing a provision for latching the closure of the dust hopper outlet.

Fig. 9 is a vertical section taken upon the line 9—9 of Fig. 1, showing the main sweeping brush and means for raising and lowering the same.

Fig. 10 is a perspective view of one of a pair of auxiliary wheels for supporting the forward end of the machine, disclosing a provision for raising such wheel to a position of disuse.

In these views, the reference character 1 designates the sweeper frame, which comprises a pair of side sills formed preferably of channel bars, suitably rigidly connected. The front portion 1ª of said frame is at a higher level than its main portion, the rear end of the former seating upon the forward end of the latter and being welded thereto, as indicated at 2. The portion 1ª comprises a cross piece 3 at its front end, preferably integral with the sides of said portion, and a coupling member 4 is centrally secured to said cross piece, adapting the sweeper for attachment to a truck or tractor. A pair of ground wheels 5 form the primary supports for the frame 1, being journaled upon stub axles 6 rigidly outwardly projecting from said frame and so positioned longitudinally of the latter as to substantially balance the load with respect to the common axis of said wheels.

A rotary sweeping brush 7 is mounted within and transversely of the frame 1 with its axis substantially in the vertical plane determined by the axis of the wheels 5, whereby said brush may rise and fall in unison with said wheels to conform to any unevenness in the surface being swept. The brush shaft 8 is journaled at its ends in the rear extremities of a pair of radius arms 9, having their forward ends pivoted upon a shaft 10 journaled transversely of the frame in bearings 10ª surmounting the raised portion 1ª of said frame. A drive may be transmitted from said shaft to the brush through an endless chain 11 engaging a pair of sprocket wheels 12. Surmounting the forward portion 1ª of the frame is an internal combustion engine 13 or some other prime mover, the shaft 14 of which drives the shaft 10 through an endless chain 15 and a pair of sprocket wheels 16.

The rear portion of the frame 1 carries a sheet metal housing 17 having substantially the full width of said frame and receiving the upper portion of the brush 7. The sides of said housing are preferably parallel, and its rear wall rises preferably at the rear end of the frame. Between said rear wall and the brush, a sweepings hopper is formed by a sheet metal plate 18 extending upwardly from the bottom of said chamber at a forward inclination, and terminating close adjacent to the brush. A pair of doors 19 and 20 are hinged as indicated at 21 and 22 respectively to the rear wall and to the bottom of the housing 17, their free edges substantially engaging in the closed position of said doors and being normally held closed by a latch hook 23 (see Fig. 8). When said doors are opened, as indicated in dash lines in Fig. 1, the contents of the sweepings hopper are free to discharge downwardly and rearwardly.

The housing 17 comprises a sweepings guide plate 24 spaced slightly forward from the brush 7 and conforming to the peripheral arc of the latter, said guide plate being mounted upon the radius arms 9 by a pair of arcuately slotted bracket members 25 secured to the front face of said plate, adjacent to said arms, the latter being clamped to said brackets by screws 26 passing through the arcuate slots. A supplemental guide plate 27 is hinged at 28 at its upper edge to the plate 24 between the latter and brush 7, its lower edge being adjacent to that of said plate 24. The lower edge of both plates 24 and 27 carry flexible flaps 29, of canvas or the like, adapted to drag upon the surface being swept. The plate 24 carries near its lower edge one or more adjusting screws 30, bearing upon the corresponding portion of the supplemental plate and regulating the spaced relation of the latter to the brush. The plate 24 is additionally supported through the formation thereupon of segmental end plates 31, extending to and pivoted on the brush shaft 8.

The housing 17 is closed at its top by a dust collector, comprising inner and outer casings 32 and 33, the lower portions of which have convergent walls forming dust hoppers 34 and 35. The annular space 36 between the casings 32 and 33 has an inlet 37 thereto, and a duct 38 leads upwardly to said inlet from the forward portion of the housing 17. The casing 32 coacts with vertically spaced plates 39 to form a drum, a plurality of tubular fabric filter members 40 extending vertically through said drum and opening at both ends in said plates. An annular partition 41 surrounds said drum in spaced relation thereto, being suspended from the top of the casing 33 and free at its lower edge. Thus, air delivered to the casing 33 at the inlet 37 circulates around the partition 41, eventually rising between the latter and said drum, and downwardly entering the filter tubes 40. Escaping through said tubes into the main body of said drum, such air is withdrawn from the latter through a pipe 42 centrally depending into the dust separator through the top thereof and leading to the inlet of a suction fan 43. The latter is of any ordinary construction and discharges the cleaned air through a suitable duct 44, extending preferably upwardly.

In the lower portions of the casings 32 and 33, endless conveyors 45 and 46 operate, the same being geared to each other as indicated at 47, and one thereof being driven from the shaft 10 through a chain 48 and sprocket wheels 49. Said conveyors discharge into a duct 50 downwardly opening in the housing 17 above the hopper, the discharge of dust from said conveyors being controlled by spring pressed closures 51 which automatically yield when accumulated dust impresses a predetermined pressure thereupon.

A portion 52 of the front wall of the housing 17 is hinged at its upper edge, as indicated at 53, and rests freely at its lower edge upon the guide plate 24. Thus, as the brush together with said guide plate plays up and down according to the contour of a roadway, an approximate air seal is maintained between the hinged plate 52 and said guide plate.

To provide for raising the sweeping brush from its position of use disclosed in Fig. 1 to its stored position shown in Fig. 6, a pair of cables 54, attached to the radius arms 9, are extended upwardly to wind upon a pair of sheaves 55, fast on a shaft 56 extending through the housing 17 above and parallel to the brush. Said shaft is rotatable by a crank 57 through an endless chain 57ª and sprocket wheels 57ᵇ, and the brush may be held raised by a pawl 58 coacting with one of said sprocket wheels.

Below the forward portion of the frame and adjacent to one side thereof (preferably the right side) a curb brush 60 is journaled in the rear end of a radius arm 61 universally pivoted upon the frame at 62. Said brush extends, through the major portion of its length outwardly beyond the main brush 7 and is slightly inclined rearwardly from its outer to its inner end, its inner end portion projecting slightly into the path of said brush 7 so that the curb brush tends when sweeping, to discharge dirt from the vicinity of the curb into the path of the main brush. The upper portion of said brush is covered by a sheet metal hood 63 suitably secured to the radius arm 61, and a pipe 64 conducts dust-laden air from said hood to the dust separator. As illustrated, said conduit opens into the duct 38 near the point of discharge of the latter to the dust separator. A lever 65 pivoted upon the frame portion 1ª is connected by a cable 66 to the rear end of the arm 61 for lowering and raising the curb brush to and from its position of use. The curb brush is driven from the engine shaft 14 through an endless chain 67.

When the described machine is attached to a truck or tractor, it requires no support at its front end other than the coupling connection to such truck or tractor. To support the front end of the machine when not so attached, a pair of auxiliary wheels 69, considerably smaller than the main wheels 5, are journaled on stub axles 70 formed upon the lower ends of arms 71, which are pivoted at their upper ends in suitable bearings 72 carried by the sides of the frame member 1ª. To adapt said wheels for use, the arms 71 are positioned substantially vertically, abutting pins 73 inwardly projecting from the sides of the frame. Hooks 74, one of which is pivoted upon each arm 71, are engageable with said pins to maintain the arms so positioned. When said hooks are released from said pins, the arms 71 are swung to the rearwardly inclined positions indicated in dash lines in Fig. 1 by coiled springs 75 extending from said arms to the frame.

In the use of the described machine, the coupling member 4 having been suitably engaged with a truck or tractor, the machine is trailed over the surface to be swept, the brushes 7 and 60 resting freely upon said surface. The engine 13 being energized, said brushes are driven in the directions of the arrows in Fig. 1. Dirt and dust encountered by the main brush impinges against the guide plates 24 and 27 and flaps 29, and is driven up by said brush and discharged into the housing 17. The heavier portion of such dirt is directly delivered to the hopper 18. The lighter dirt raised by said brush is entrained by the air current created by the suction fan 43, and is drawn through the duct 38 and inlet 37 into the annular space 36, where its rapid rotation tends to centrifugally separate out the heavier particles of such dust. Such particles descend by gravity into the hopper 35, from which they are continuously discharged by the conveyor 45 into the hopper 18. The finer particles of suspended dust are filtered out by the tubes 40, from which they drop of their own weight into the hopper 34 to be discharged therefrom by the conveyor 45 into the hopper 18.

The curb brush deflects the heavier portions of encountered dirt into the path of the main brush, throwing the lighter particles into suspension in the hood 63, from which they are drawn through the pipe 64 and delivered to the dust separator.

The described machine is thus adapted to thoroughly sweep the surface traversed thereby without contaminating the atmosphere with dust clouds, and because of the trailer nature of said machine, it is adapted to be built at a relatively low cost.

The machine is not, however, limited to trailer use, and its drive may be effected in any desired manner.

While it is apparent that the illustrated embodiment of my invention is well calculated to adequately fulfill the objects and advantages primarily stated, it is to be understood that the invention is susceptible to modification, variation and change within the spirit and scope of the subjoined claims.

What I claim is:

1. In a street sweeping machine, a wheeled frame, a rotary sweeping brush journaled transversely of said frame, a housing enclosing the top portion of said brush, formed with a dirt-receiving hopper rearwardly of the brush, a dust separator mounted above said hopper and having a lower hopper portion and a dust discharge opening from said hopper portion into said hopper, means for withdrawing air from said housing through said separator, and drive means for said brush.

2. In a street sweeping machine, a wheeled frame, a rotary sweeping brush journaled transversely of said frame, a pair of radius arms journaling said brush and coaxially pivoted upon said frame to afford the brush a vertical travel, means for adjusting said arms pivotally, means for rotatively driving the brush, a dirt hopper carried by said frame for receiving sweepings from the brush, and a cover plate for the brush forwardly spaced from the brush and carried by said radius arms, and means for vertically adjusting said cover plate on said arms.

3. In a street sweeping machine, a frame, a pair of coaxial supporting wheels for said frame, a sweeping brush journaled upon said frame with its axis substantially in the vertical plane of the axis of said wheels, a prime mover carried by said frame, a drive connection from said prime mover to said brush for rotating the brush, a second pair of supporting wheels upon said frame of relatively small diameter, means for raising and lowering said smaller wheels to engage them with or disengage them from a street, and means carried by said frame for holding said smaller wheels raised.

In testimony whereof I sign this specification.

WILLIAM T. BLANEY.